(12) United States Patent
Goyal et al.

(10) Patent No.: US 12,726,574 B2
(45) Date of Patent: Sep. 1, 2026

(54) AI AGENT IN VISUAL VOICEMAIL DAEMON

(71) Applicant: Apple Inc., Cupertino, CA (US)

(72) Inventors: Mansi Goyal, Cupertino, CA (US); Ajoy K Singh, Cupertino, CA (US); Andrey Berezin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 270 days.

(21) Appl. No.: 18/599,866

(22) Filed: Mar. 8, 2024

(65) Prior Publication Data

US 2025/0286954 A1 Sep. 11, 2025

(51) Int. Cl.
*H04M 3/533* (2006.01)
*G10L 15/22* (2006.01)

(52) U.S. Cl.
CPC ......... *H04M 3/53333* (2013.01); *G10L 15/22* (2013.01)

(58) Field of Classification Search
CPC ................................................ H04M 3/53333
See application file for complete search history.

(56) References Cited

U.S. PATENT DOCUMENTS

| | | | |
|---|---|---|---|
| 7,613,721 B2 | 11/2009 | Horvitz et al. | |
| 10,741,185 B2 | 8/2020 | Gruber et al. | |
| 10,827,071 B1 | 11/2020 | Adibi et al. | |
| 11,388,291 B2 | 7/2022 | Van Os et al. | |
| 11,831,733 B2 | 11/2023 | Rogynskyy et al. | |
| 2019/0014070 A1 | 1/2019 | Mertvetsov et al. | |
| 2023/0403357 A1 | 12/2023 | Ezell | |
| 2024/0430363 A1 * | 12/2024 | Neate | H04M 3/5335 |

FOREIGN PATENT DOCUMENTS

| | | |
|---|---|---|
| CN | 109377152 A | 2/2019 |
| CN | 113888183 A | 1/2022 |
| DE | 10338237 A1 | 3/2005 |
| KR | 10-2259244 B1 | 5/2021 |

* cited by examiner

*Primary Examiner* — Curtis B Odom
(74) *Attorney, Agent, or Firm* — YHE Law LLP

(57) ABSTRACT

Disclosed is technology that analyzes voicemail data and takes a particular action based on the analysis of the data. For example, a user device (e.g., a smart phone) can receive a voicemail from an external caller and analyze data representative of the voicemail with an artificial intelligence agent. The artificial intelligence agent can utilize contextual data including user device contextual data and past voicemail contextual data to determine the appropriate task to perform based on the voicemail. Based on that determination, the user device can automatically perform the task that is relevant to the voicemail on behalf of the user.

21 Claims, 5 Drawing Sheets

AI AGENT IN VISUAL VOICEMAIL DAEMON

BACKGROUND

Traditional voicemail systems have long served as a means for individuals to receive and retrieve messages when unavailable to answer incoming calls. Voicemail originated under landline phones with a separate "answering machine" receiving the call and playing a pre-recorded message for the caller. This functionality has now found its way on to smart phones in the form of a service within the phone application.

While voicemail has been an essential communication tool, its functionality has largely remained static, limited to recording and playback of messages. However, recent developments in voicemail technology have allowed voice recordings to be analyzed and transcribed into text data. This text data can alleviate the need for a user to listen to all or part of the voicemail, and instead receive the message textually if that is preferred by the user.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
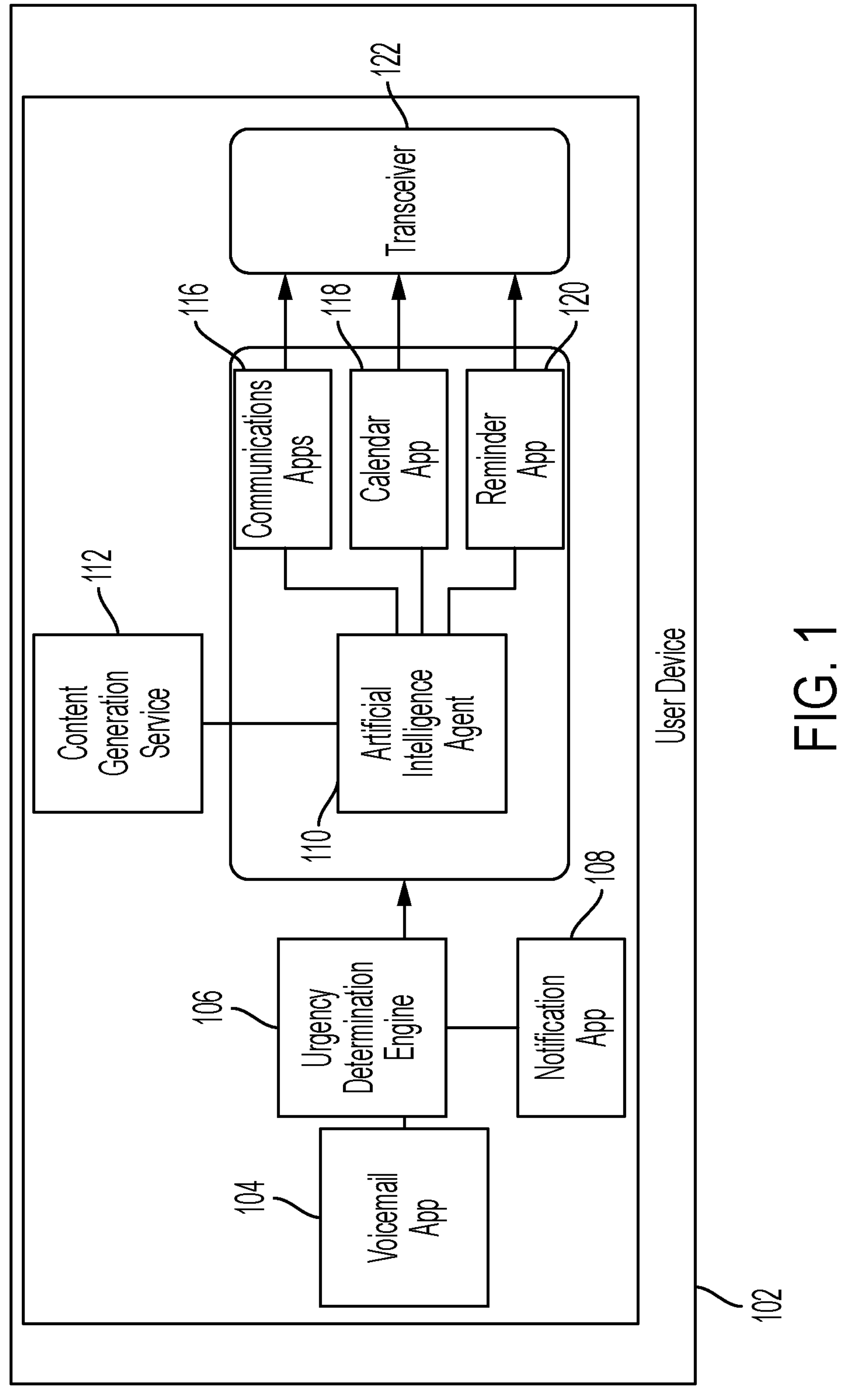
FIG. 1 illustrates a schematic diagram in accordance with some embodiments of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In recent years, there has been a notable decline in the popularity of telephone calls, juxtaposed with a significant rise in the utilization of email, text, and direct messaging platforms. This shift can be attributed to the inherent advantages of written communication mediums over verbal ones. Unlike telephone calls, which demand immediate attention and response, written messages afford recipients the flexibility to read and respond at their convenience. The asynchronous nature of email, text, and direct messages allows individuals to manage their communication more efficiently, eliminating the pressure of instant availability imposed by telephone calls.

Voicemails were invented in the 1970s to alleviate the need for a person to answer the telephone. Early iterations of voicemail were integrated into standalone answering machines, which recorded incoming messages onto physical tapes or digital memory storage. These answering machines became ubiquitous fixtures in homes and offices, offering a means to capture and retrieve missed calls conveniently. However, with the advent of smartphones and the proliferation of mobile technology, voicemail functionality underwent a transformative shift. Today, voicemail services have transitioned from dedicated machines to software applications seamlessly integrated into smartphones. Users can now access, record, and manage voicemails directly through their smartphone interfaces, eliminating the need for standalone devices while providing enhanced accessibility and functionality in the digital age.

Technology has also improved voicemail by providing functionality for transcribing voicemails into text. Voice-to-text transcription services utilize advanced algorithms and machine learning models to analyze audio input, decipher spoken words, and accurately convert them into written text in real-time or after the recording has been processed. As a result, a voicemail can now be converted into text form and either read by the user or utilized for other purposes.

Even with the improvements to voicemail technologies in recent years, additional features are needed. Mobile phones and voice over Internet Protocol (VOIP) phones now have features such as 'do not disturb' and 'focus' modes, which are effective in suppressing notifications, such as a ringing telephone or new voicemail notification when these modes are enabled. However, this prevents urgent calls from getting through to the user. Accordingly, there is a need for a mechanism that can determine when a voicemail pertains to an urgent matter such that a notification should be presented to the user.

Furthermore, many phone calls are from automated services asking a user to merely confirm an appointment or some other simple task. Users would prefer to not be interrupted by voicemails of this type. Accordingly, there is a need for a mechanism that can recognize such voicemails and automatically respond to them.

The presently disclosed technology analyzes voicemail data and takes a particular action based on the analysis of the data. For example, a user device (e.g., a smart phone) can receive a voicemail from an external caller and analyze data representative of the voicemail with an artificial intelligence agent. The artificial intelligence agent can utilize contextual data including user device contextual data and past voicemail contextual data to determine the appropriate task to perform based on the voicemail. Based on that determination, the user device can automatically perform the task that is relevant to the voicemail on behalf of the user.

In some embodiments, the voicemail can be transcribed by a voice-to-text transcription engine to generate textual data corresponding to the voicemail.

In some embodiments, the voicemail can be analyzed by an artificial intelligence agent to ascertain voice pitch, volume, or wording that may suggest the voicemail is urgent. The user device can then take appropriate action if the voicemail is determined to be urgent, for example, by overriding a "Focus" or "silent mode" setting on the user device and notifying the user of the voicemail.

In some embodiments, the artificial intelligence agent can communicate with a content generation service to generate content that is then transmitted via communications applications to facilitate the performing of tasks on the user's behalf.

The present technology addresses several technical challenges. Specifically, the present technology first must determine a confidence score that a transcribed voicemail is accurate enough to be properly interpreted. Some voicemails may be of poor quality for a variety of reasons, and the user would be better-suited if the present technology responded on behalf of the user and ensured the contents of the voicemail were understood before doing so.

The present technology must also be able to correctly identify the urgency of a voicemail, which can include understanding the content of the voicemail, a user context, and whether the voicemail was left by a bot or a human. Urgent voicemails typically must be responded to within a short period of time. Non-urgent voicemails, however, are more likely to contain tasks that the present technology can accomplish by responding on behalf of the user. For example, a doctor's office asking to confirm an appointment can qualify as a non-urgent task where the present technology can respond on behalf of the user and remove this mundane task from the user's "to do list." A message by a bot may also be an indication that the message is either not urgent and capable of response by the present technology, or that the message need not be responded to at all.

The present technology must also be able to determine a confidence score regarding a task that can be performed to respond to the voicemail. The user may provide predetermined authorization for the performance of certain tasks, for example, the confirmation of appointments as discussed above. Alternatively, or in addition to the above, the present technology may determine by machine-learning which tasks are authorized. For example, the present technology may determine which tasks are authorized by examining the predetermined authorized tasks and using an inferential logic model to determine additional authorized tasks that may be performed based on the predetermined authorized tasks. In this manner, the authorized tasks can be user-specific both expressly (through pre-authorization) or implicitly (through machine learning). The user may authorize or de-authorize the inferential model, in some embodiments.

The present technology may also benefit from being able to determine that it can perform the task and that the user approves of the task being performed on its behalf. For example, the present technology may examine the applications on the user device to determine whether they are capable of carrying out the task, and aligning those applications with the authorizations provided by the user. For example, the user may not have authorized the use of a phone call application to respond to a voicemail that confirms an appointment, but the user may have authorized the use of a messaging application to do so. Here, the present technology can determine not only which authorizations have been provided by the user, but whether the applications corresponding to the authorization can carry out the task required by the voicemail.

FIG. 1 illustrates a schematic diagram of a system for using an artificial intelligence agent for analyzing voicemails in accordance with some embodiments of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

As shown, a user device 102 includes a voicemail application 104 that receives voicemails from callers. The voicemail application 104 can be communicably coupled to an urgency determination engine 106 that is itself communicably coupled to a notification application 108. The user device 102 can also include an artificial intelligence agent 110 that is communicably coupled to a content generation service 112. The artificial intelligence agent 110 can be in communication with the user device's communications applications 116, calendar application 118, and reminder application 120. These applications can send and receive data to and from the user device 102 via a transceiver 122.

The user device 102 can be any device capable of receiving a voicemail or a data representation of a voicemail. Example user devices 102 include smartphones, tablets, laptops, desktop computers, spatial computing devices (e.g., Apple Vision Pro®), and wearable devices (e.g., Apple Watches®). The user device 102 can include conventional hardware for such devices, such as one or more processors, display screens, storage media, user interfaces, transceivers, and power sources. The user device 102 can also include an operating system installed on the user device 102, such as a version of the iOS® operating system. The operating system can manage hardware resources, provide the user interface, and ensure system stability and functionality.

The voicemail application 104 can be any software functionality stored or retrievable by the user device 102, and that receives voicemails. In some embodiments, the voicemail application 104 can include or be operatively coupled to a voice-to-text engine that transcribes the audio of the voicemail into corresponding text. Alternatively, the user device 102 can utilize one or more multi-modal large language models to receive audio and output corresponding text or audio outputs that help facilitate the task performance or urgency notification to the user. The voicemail application 104 can also be operatively coupled to storage on the user device 102 to store the voicemails or data representative thereof.

The urgency determination engine 106 can be any software functionality that analyzes data from the voicemail and determines the urgency of the message in the voicemail on the basis of that analysis. For example, the urgency determination engine 106 can include or be coupled to a large language model that analyzes the words of the voicemail to determine whether word patterns exist that would classify the voicemail as urgent. This classification can be determined in a number of ways; for example, the large language model can be trained by past voicemails of the user device 102 as communicated by the voicemail application 104 or as stored in the storage of the user device 102, and determine how quickly the user responded to the voicemail based on the word patterns in the voicemail. Alternatively, or in addition to the above, the urgency determination engine 106 can search for predetermined word patterns such as "this is urgent" or "immediately" or "emergency" to determine whether the voicemail is considered urgent. In some embodiments, the urgency determination engine 106 analyzes the pitch, tone, and volume of the voicemail to determine whether urgency is expressed in the voice of the user. Any other manner of determining urgency can be implemented without departing from the spirit and scope of the presently disclosed technology.

The notification application 108 can be any one or more applications that notifies the user. For example, the notification application can notify the user through audible, visual, or tactile means. The notifications can be displayed messages, predetermined audio sounds (e.g., a custom sound indicating the message is urgent), a haptic feedback element, or any other manner of notifying the user.

The artificial intelligence agent 110 can be any agent capable of analyzing data from the voicemail and performing tasks on the user's behalf. The artificial intelligence agent 110 is a fine-tuned machine learning algorithm that is configured to analyze voicemails to determine if they are relevant to one or more configured actions. In some embodiments, the artificial intelligence agent 110 and the urgency determination engine 106 can be part of the same machine learning model. The artificial intelligence agent 110 can also be a multi-functional daemon that operates as a background process without direct operation by the user, except in limited circumstances. As discussed in more detail herein, the artificial intelligence agent 110 can be trained by any data of the user or data of other users. Some exemplary data sources include past voicemails received by the user, the voicemail words, tone, volume, pitch, and identification of the sender, third party data indicating urgency, or any other data.

The artificial intelligence agent 110 can also perform various sub-tasks necessary in the performance of the larger task necessitated by the voicemail. For example, the artificial intelligence agent can determine whether it has permission and privileges to perform various actions, or what confidence threshold must be met in order to perform the tasks. For example, the user can input a predetermined confidence threshold, or the artificial intelligence agent 110 can dynamically determine a confidence threshold, relating to the quality of the voicemail that must be met before taking action on behalf of the user. The artificial intelligence agent 110 can also retrieve predetermined data from the storage of the user device 102, such as user data, personal information, passwords, and settings such as when the user must be prompted for permission before performing a task. Additionally, the artificial intelligence agent 110 can determine tasks to be performed based on device settings such as focus mode, battery level, cellular connectivity, foreground and background application state, voice call configuration (e.g., caller unknown, call likely to be spam or a bot), audio quality of voicemail, topic and sentiment detection, content of voicemail, and any other information required to determine what action to perform.

In some embodiments, the artificial intelligence agent can be a chatbot, virtual assistant, large language model, other machine learning model, or a combination of such.

The content generation service 112 can be a service that provides content on behalf of the user. The content generation service 112 can be communicably coupled to the artificial intelligence agent 110 and receive dynamic prompts for content that imitates the user in performing tasks on behalf of the user. For example, the content generation service can provide the user's voice, or text for a text message, or a video "deep fake" of the user in performance of the user's tasks.

In some embodiments, the content generation service 112 can be a large language model. In some embodiments, such as when the artificial intelligence agent 110 is a large language model, the content generation service 112 can be the same or a different large language model. For example, the artificial intelligence agent 110 can include an on-device large language model, while the content generation service 112 can be a third-party large language model accessible by application programming interfaces over a networked connection.

The communications applications 116 can be any applications capable of communication with another party. For example, the communications applications 116 can be a telephone, voice over internet protocol (VOIP), text message, social media, or other messaging application.

The calendar application 118 can be any application capable of recording tasks to be performed at various times by the user. In one embodiment, the calendar application 118 allows dynamic adding, subtracting, and modification of appointments to electronically "block out" certain times where the user is unavailable. The artificial intelligence agent 110 can then avoid scheduling tasks at the blocked-out times when scheduling various tasks on behalf of the user. The reminder application 120 can be any application or service that communicates with the notification application to notify the user of upcoming appointments stored in the calendar application 118.

The transceiver 122 serves as the intermediary component responsible for exchanging data between the user device 102 and external networks, devices, or systems. Examples of transceivers encompass a spectrum of technologies and protocols, including but not limited to Wi-Fi, Bluetooth, cellular, NFC (Near Field Communication), RFID (Radio-Frequency Identification), and Zigbee.

There are several use cases for the presently disclosed technology, none of which are intended to be limiting.

Consider the following scenario: a parent is at work while their child is at school. The child unfortunately becomes ill and needs to leave the school and go home to recover. The school calls the parent, whose telephone is in focus mode to provide the parent greater focus while at work. The school has no choice but to leave a voicemail on the parent's phone due to the limited interruption setting being enabled on the phone.

Some embodiments of the presently disclosed technology would analyze the school's voicemail stored in the voicemail application 104 of the parent's user device 102. The embodiment would then determine whether the parent's user device 102 should notify the parent anyway, despite the focus mode being activated. For example, the user device 102 could analyze the text and tone of the voicemail with the urgency determination engine 106 and determine the words and/or tone of the voicemail imply an urgent voicemail. The urgency determination engine 106 would perform this analysis by comparing the words of the voicemail to word patterns, content, and speech characteristics that characterize an urgent message. The user device 102 would then notify the parent using the notification application 108 and associated hardware (e.g., display, tactile vibration mechanism, etc.) despite the fact that the parent's phone is in focus mode.

The present technology also includes use cases for performing tasks based on the analysis of voicemail. For example, the presently disclosed technology can receive a voicemail from a doctor's office expressing the need for routine blood work. The urgency determination engine 106 can retrieve data from the voicemail application 104 to determine that the voicemail is not urgent. Thereafter, the artificial intelligence agent 110 can determine whether the voicemail requires any task to be performed, for example, using a large language model. Here, the artificial intelligence agent 110 determines a task needs to be performed (i.e., respond to the doctor) and determines whether the artificial intelligence agent 110 is authorized to respond on the user's behalf. If so, the artificial intelligence agent 110 can communicate with the doctor's office through the communications applications 116 and schedule an appointment that complies with the calendar application 118, all through the hardware of the transceiver 122. Prior to the appointment, the user can be notified through the reminder application 120. The user was therefore able to respond to the voicemail and schedule an appointment without lifting a finger.

As described above, one aspect of the present technology is the gathering and use of data available from various sources to improve the generation of stories generated. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to infer which tasks may be performed by the present technology based on personal information of the user and/or based on other preauthorized tasks. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide mood-associated data. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 2:
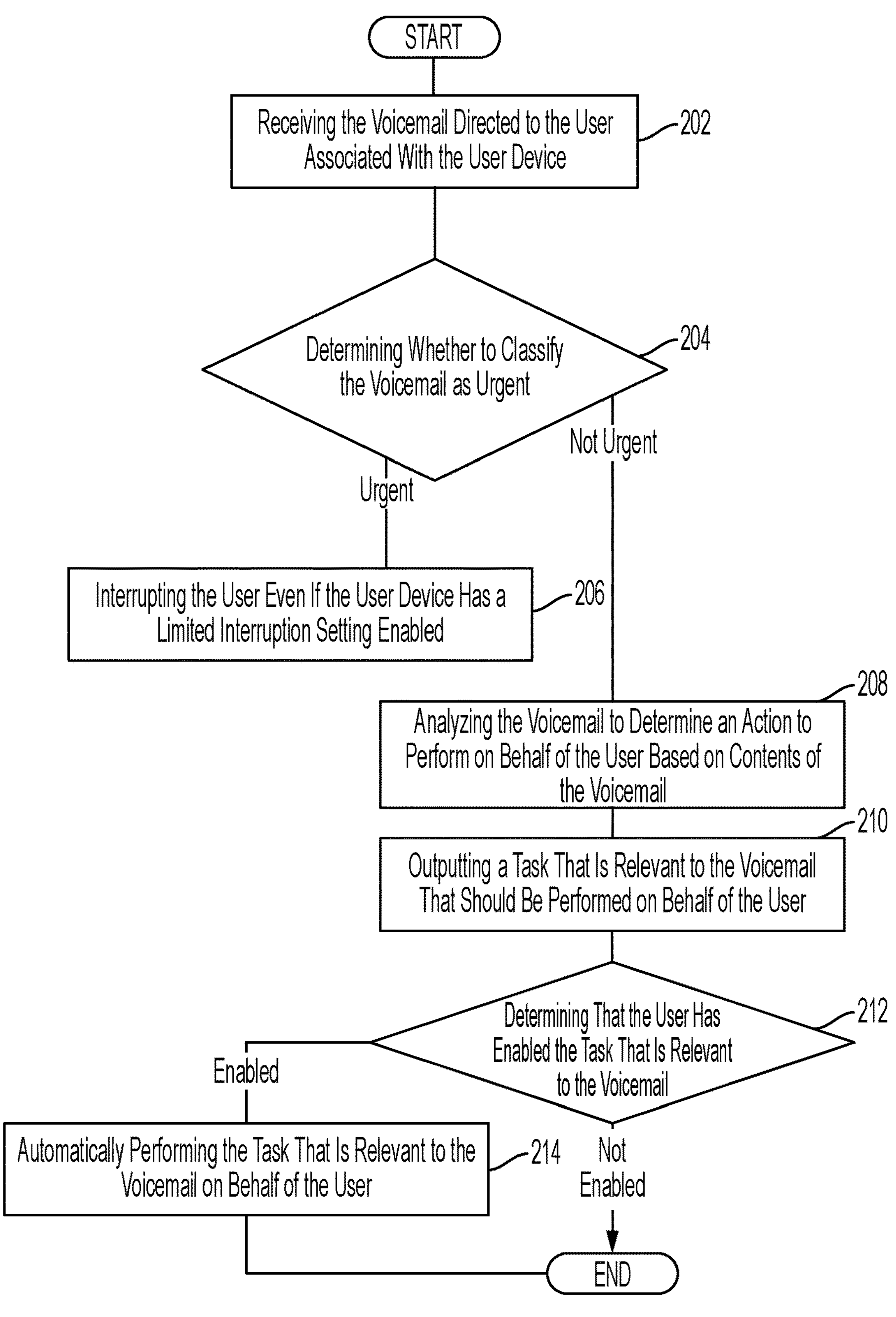
FIG. 2 illustrates a flow chart in accordance with some embodiments of the present technology.

FIG. 2 illustrates an example routine for receiving a voicemail and acting in response to the voicemail. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes receiving the voicemail directed to the user associated with the user device at block 202. For example, the user device 102 illustrated in FIG. 1 may receive the voicemail directed to the user associated with the user device 102. The voicemail may be received in the voicemail application 104 after having been received into the user device 102 through the transceiver 122. In some embodiments, the voicemail may be transcribed into words by a voice-to-text engine included within or in operable communication with the voicemail application 104. In other embodiments, the voicemail remains in audio form and is input into one or more large language model(s) if such large language model(s) are multi-modal and capable of receiving audio and creating outputs from the audio.

According to some examples, the method includes determining whether to classify the voicemail as urgent at decision block 204. For example, the urgency determination engine 106 illustrated in FIG. 1 may determine whether to classify the voicemail as urgent. The urgency determination engine 106 can be a trained machine learning algorithm configured to output a conclusion that the voicemail is directed to an urgent topic along with an urgency confidence interval. The urgency determination engine 106 is trained by attempting to classify voicemails as urgent and comparing the classification with a label of urgent or not urgent. The labels take into account an analysis of whether the speaker is a bot and/or whether the content of the message indicates urgency and is not a scam, and/or parameters of the speech, among other factors.

For example, speech within the voicemail that has frequency characteristics indicative of a non-human voice is likely to be a bot. Similarly, voicemails including periods of silence are indicative of a bot. The urgency determination engine can also use a heuristic to determine if the voicemail is from a bot. For example, the heuristic can determine that a ratio of speech to silence is too low to be a human, or that certain gaps in frequency ranges are abnormal for a human.

The urgency determination engine 106 can also utilize an analysis of whether parameters of speech within the voicemail are indicative of urgency. The parameters of speech can include amplitude, words per minute, and frequency. Other factors indicative of urgency include the actual words or other content of the voicemail, the identification of the party (e.g., an emergency room would indicate urgency), or time of day in which the voicemail is received (middle of night or middle of work day).

The urgency determination engine 106 can also analyze the content of the message to determine that the content might be urgent. For example, the urgency determination engine 106 can search for predetermined word patterns such as "this is urgent" or "immediately" or "emergency" or other words or phrases to determine whether the voicemail is considered urgent. Such analysis may also be combined with other factors such as the parameters or speech, whether the voice is from a bot, and other characteristics of the call such as the caller ID information and whether the caller is in the contacts list of the user to avoid a false positive determination that the voicemail is urgent when it is really a scam.

If the urgency determination engine 106 determines the voicemail is not urgent, the urgency determination engine can automatically classify the voicemail as not urgent, in some embodiments.

According to some examples, the method includes interrupting the user even if the user device has a limited interruption setting enabled at block 206. For example, the notification application 108 illustrated in FIG. 1 may interrupt the user even if the user device has a limited interruption setting enabled. The interrupting the user can be a notification triggered by the urgency determination engine 106 highlighting that the voicemail pertains to an urgent topic and includes a summary of the topic and an identification of the caller. The notification application 108 can notify the user in any manner, including through visual, haptic, or audio means.

According to some examples, the method includes analyzing the voicemail to determine an action to perform on behalf of the user based on contents of the voicemail at block 208. For example, the artificial intelligence agent 110 illustrated in FIG. 1 may analyze the voicemail to determine an action to perform on behalf of the user based on contents of the voicemail. The artificial intelligence agent 110 is a fine-tuned machine learning algorithm that is configured to analyze voicemails to determine if they are relevant to one or more configured actions. The fine tuning of the machine learning algorithm can be achieved by providing labeled examples of voicemails along with device contexts. This can allow the artificial intelligence agent 110 to learn to balance when a voicemail is urgent enough to interrupt a user in a particular context. For example, a voicemail might be considered urgent enough to interrupt a user while a device is in a 'focus' mode, but not urgent enough to interrupt a use while a device is in a 'do not disturb' or 'night' mode. The present technology also pertains to the performing of some tasks on behalf of the user and the determination to perform a task can also vary depending on the device context. While 'focus,' 'do not disturb,' and 'night' modes have been provided as examples of device contexts, other factors are relevant to device contexts.

For example, the analyzing the voicemail to determine the action to perform on behalf of the user can include receiving user device context information including one or more of a location of user device 102, applications in use on the user device, an application in focus on the user device, and status of the limited interruption setting. In this manner, the artificial intelligence agent can utilize user device context in the analysis of determining the action to perform on behalf of the user.

The analyzing the voicemail to determine the action to perform on behalf of the user can include receiving by the artificial intelligence agent a transcription of the voicemail along with a quality score indicating a confidence in the quality of the translation. This can be important because some voicemails might not include clearly spoken text. Whether a voicemail is delivered from an inconsistent connection where portions of speech might have been dropped, or the voicemail is recorded in a noisy environment making it hard to understand the speaker, or the voicemail is from a person having an accent that the transcription agent is not well suited to understand, the transcription might not be reliable. Since the present technology pertains to making decisions to perform actions based on the content of the voicemail, it is important that the artificial intelligence agent has enough confidence in the content of the voicemail before it takes action on behalf of the user.

The analyzing the voicemail to determine the action to perform on behalf of the user can include receiving transcriptions of past voicemails, whereby the transcriptions of the past voicemails provide user-specific context to the artificial intelligence agent. The analyzing the voicemail can occur contemporaneously with the determining whether the voicemail is urgent. This can be important because the analysis of past voicemails provides additional context relevant to the user. For example, it might be determined that a voicemail from a friend is more important than a voicemail from a less important contact. While both numbers might be in the user's contacts, the friend might have left more voicemails and this might signal that their message is more important. Additionally, the artificial intelligence agent can identify voicemails where the user returned a call in response to the voicemail as compared with voicemails which the user ignored. All of this context provides additional personalization to the determinations made by the artificial intelligence agent.

Although, FIG. 2 shows illustrates that an urgent voicemail results in an interruption at block 206 without continuing to block 208 to determine an action to perform on behalf of the user based on the contents of the voicemail, this is merely an embodiment. In some embodiments, the artificial intelligence agent can analyze the voicemail to determine an action to perform on behalf of the user based on the contents of the voicemail at block 208, even if the voicemail was considered urgent at block 206. For example, it could be that there are still some tasks that need to be performed along with notifying the user right away at block 206. For example, an appointment slot may have opened up for three hours from now. Based on the user's calendar, the agent might determine that the user would be free, so along with notifying the user, the artificial intelligence again can book the appointment.

According to some examples, the method includes outputting a task that is relevant to the voicemail that should be performed on behalf of the user at block 210. For example, the artificial intelligence agent 110 illustrated in FIG. 1 may output a task that is relevant to the voicemail that should be performed on behalf of the user. For example, the artificial intelligence agent 110 can utilize a large language model to determine the requests made in the voicemail and the corresponding task to be performed in order to complete the request. The artificial intelligence agent 110 can also output a task confidence score that indicates a confidence by the artificial intelligence agent 110 that the task should be performed on behalf of the user.

According to some examples, the method includes determining that the user has enabled the task that is relevant to the voicemail at decision block 212. For example, the artificial intelligence agent 110 illustrated in FIG. 1 may determine that the user has enabled the task that is relevant to the voicemail. The artificial intelligence agent 110 is authorized to perform enabled tasks and not authorized to perform non-enabled tasks. Any manner of determining authorization can be implemented, but in some embodiments, the user predetermines which tasks the artificial intelligence agent 110 may perform. In some embodiments, the artificial intelligence agent 110 can analyze the voicemails previously stored in storage on the user device 102 to determine tasks that the user should enable the artificial intelligence agent 110 to perform. For example, the artificial intelligence agent 110 can analyze past voicemails and determine which voicemails resulted in a specified action within a close proximity of time. The artificial intelligence agent 110 can then prompt the user for permission to perform such tasks as part of the "onboarding" of the artificial intelligence agent 110 during or immediately after installation. Alternatively, or in addition to the above, the user may simply choose which applications the artificial intelligence agent 110 can access from a menu.

According to some examples, the method includes automatically performing the task that is relevant to the voicemail on behalf of the user at block 214. For example, the artificial intelligence agent 110 illustrated in FIG. 1 may automatically perform the task that is relevant to the voicemail on behalf of the user. The performing is based on the output of the task that is relevant to the voicemail. In some embodiments, the tasks can be pre-configured based on the vendor of the artificial intelligence agent 110 so they are associated with a specific application that can carry out the task. For example, a scheduling task may be pre-configured to be associated with the calendar application 118 shown in FIG. 1. Alternatively, or in addition to the above, the artificial intelligence agent 110 vendor can provide a software development kit (SDK) to application developers to assist in the creation of applications that can be associated with the artificial intelligence agent 110 when such tasks are necessary to be performed. These developed applications can call application programming interfaces (APIs) of the artificial intelligence agent 110 vendor and register as being a pre-approved application for performance of various tasks. These pre-approved applications can then be advertised to the user through the user device 102. The user can pre-select applications to perform various tasks, in some examples.

In some embodiments, the artificial intelligence agent 110 may need to translate the voicemail into a language understandable by the user as a task. While artificial intelligence agent 110 might be able to understand a number of languages to determine the urgency of a message and take action on behalf of the user in a language foreign to the user, the artificial intelligence agent 110 can also translate the voicemail so that the user is fully informed about the voicemail and the tasks performed on their behalf. Such an embodiment can be useful, especially when the user is traveling.

Figure 3:
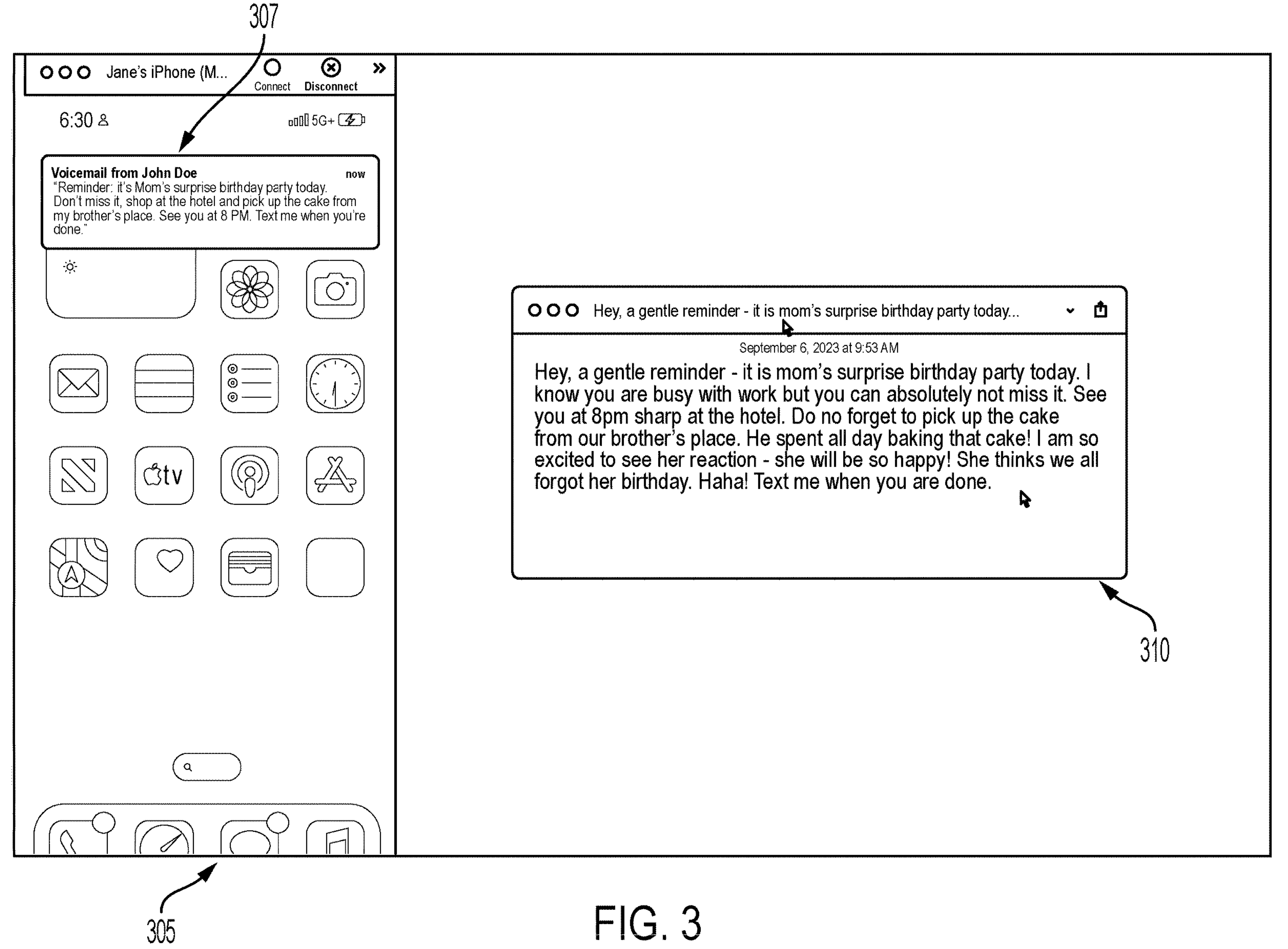
FIG. 3 illustrates an exemplary user interface providing a transcription of a voicemail in accordance with some embodiments of the present technology.

FIG. 3 illustrates an exemplary user interface providing a transcription of a voicemail in accordance with some embodiments of the present technology. As shown, a user's home screen 305 includes a voicemail summary window 307. If the user were to select the voicemail summary window 307, the user would be directed to a more detailed voicemail transcription window 310 that displays the exact text of the voicemail.

A process according to FIG. 3 would proceed by receiving a voicemail on the user device 102 of the user. For example, the user could receive the voicemail on their smart phone. Here, the user is in "Focus" mode so they would not ordinarily receive any alerts relating to the voicemail until the user opens their phone and sees a notification (e.g., a banner or badge). But here, the artificial intelligence agent 110 analyzes the voicemail and extracted the text shown in the voicemail transcription window 310. The urgency determination engine 106 then determined the voicemail to relate to an urgent matter based on a large language model analysis of the contents of the voicemail which, as discussed above, can include the text or tone of the voicemail. The artificial intelligence agent 110 then caused the display of a summary of the voicemail contents in the voicemail summary window 307.

In some embodiments, the artificial intelligence agent 110 can also extract any tasks that are presented in the voicemail. For example, in the voicemail shown in FIG. 3, the voicemail includes a task of "attend mom's surprise birthday party" with a time of "8:00 pm." Another task would include "Pick up cake." In this embodiment, the artificial intelligence agent 110 would display the tasks to be performed in the voicemail summary window 307 to quickly summarize the relevant content of the voicemail and the tasks to be performed by the user. The user device 102 can also provide an audio notification to the user, for example, a voice speaking the following "John sent you a voicemail and it sounds urgent. Please see the voicemail summary window for more."

The example embodiment of FIG. 3 illustrates one manner of carrying out the presently disclosed technology. In this example, an urgent voicemail is summarized and presented to the user in a convenient manner, with necessary tasks clearly identified. This example highlights how the presently disclosed technology can overcome some of the drawbacks of conventional voicemail and the tendency of users to sometimes prefer written communication as an alternative.

Figure 4:
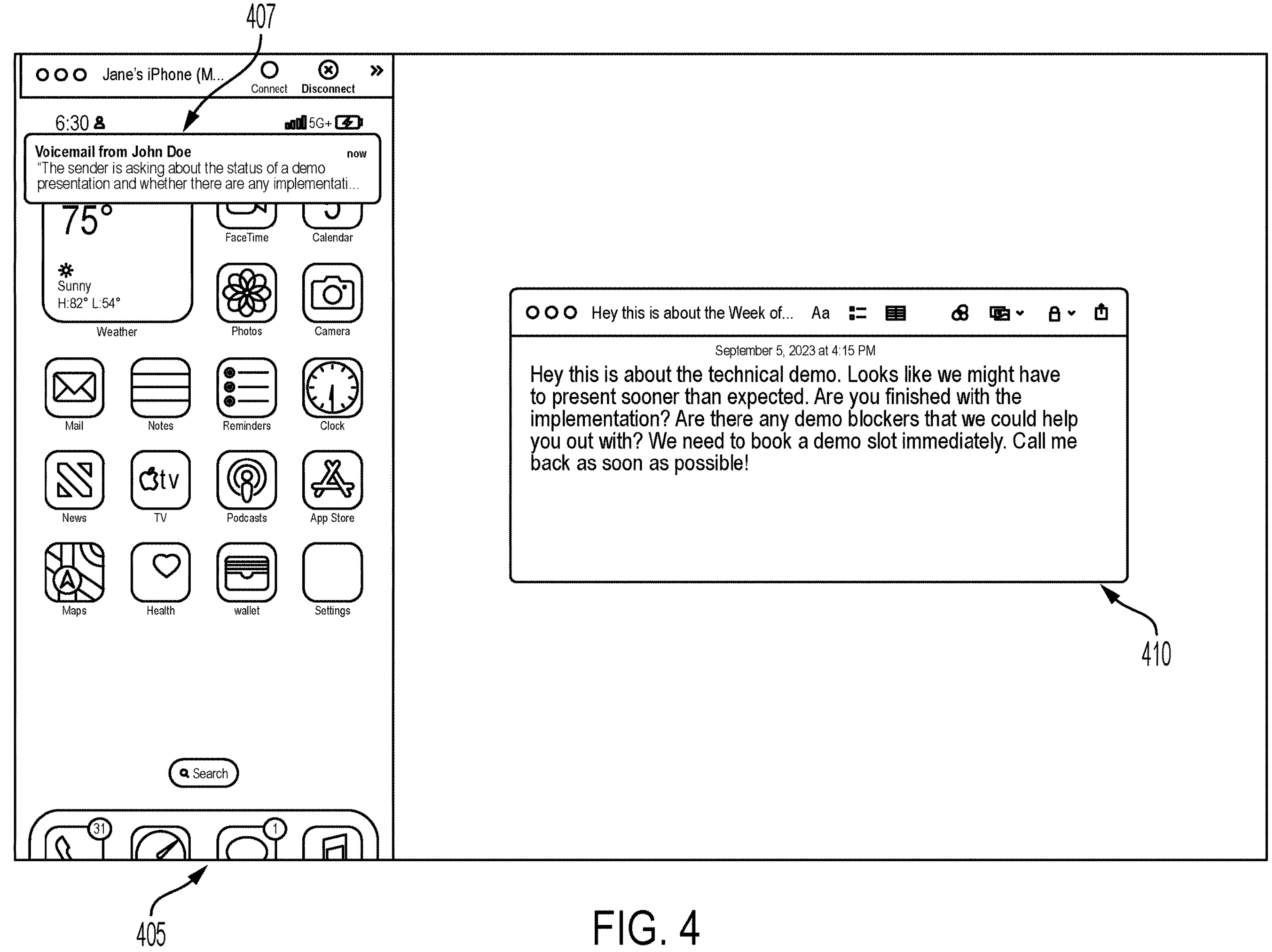
FIG. 4 illustrates another exemplary user interface providing a transcription of a voicemail in accordance with some embodiments of the present technology.

FIG. 4 illustrates another exemplary user interface providing a transcription of a voicemail in accordance with some embodiments of the present technology. The example of FIG. 4 is similar to that of FIG. 3, with like numbers representing like elements. For example, the home screen 405, voicemail summary window 407, and voicemail transcription window 410 all function similar to that described in FIG. 3.

In the FIG. 4 example, the urgency determination engine 106 again determined the voicemail to relate to an urgent matter based on a large language model analysis of the contents of the voicemail. The artificial intelligence agent 110 then caused the display of a summary of the voicemail contents in the voicemail summary window 407. Like in FIG. 3, the user could then be alerted and could view the full voicemail by selecting the text in the voicemail summary window 407.

FIG. 4 differs from FIG. 3 in that the artificial intelligence agent can determine the tasks required in the voicemail can be performed by the artificial intelligence agent 110 itself. Of course, the FIG. 3 task of picking up a birthday cake cannot be performed by the artificial intelligence agent 110. But the FIG. 4 voicemail requests the user to book an appointment to set up a demo slot. Here, the artificial intelligence agent 110 can interact with the communications applications 116 and the calendar application 118 to call or text the voicemail sender and set up the appointment, as requested.

Figure 5:
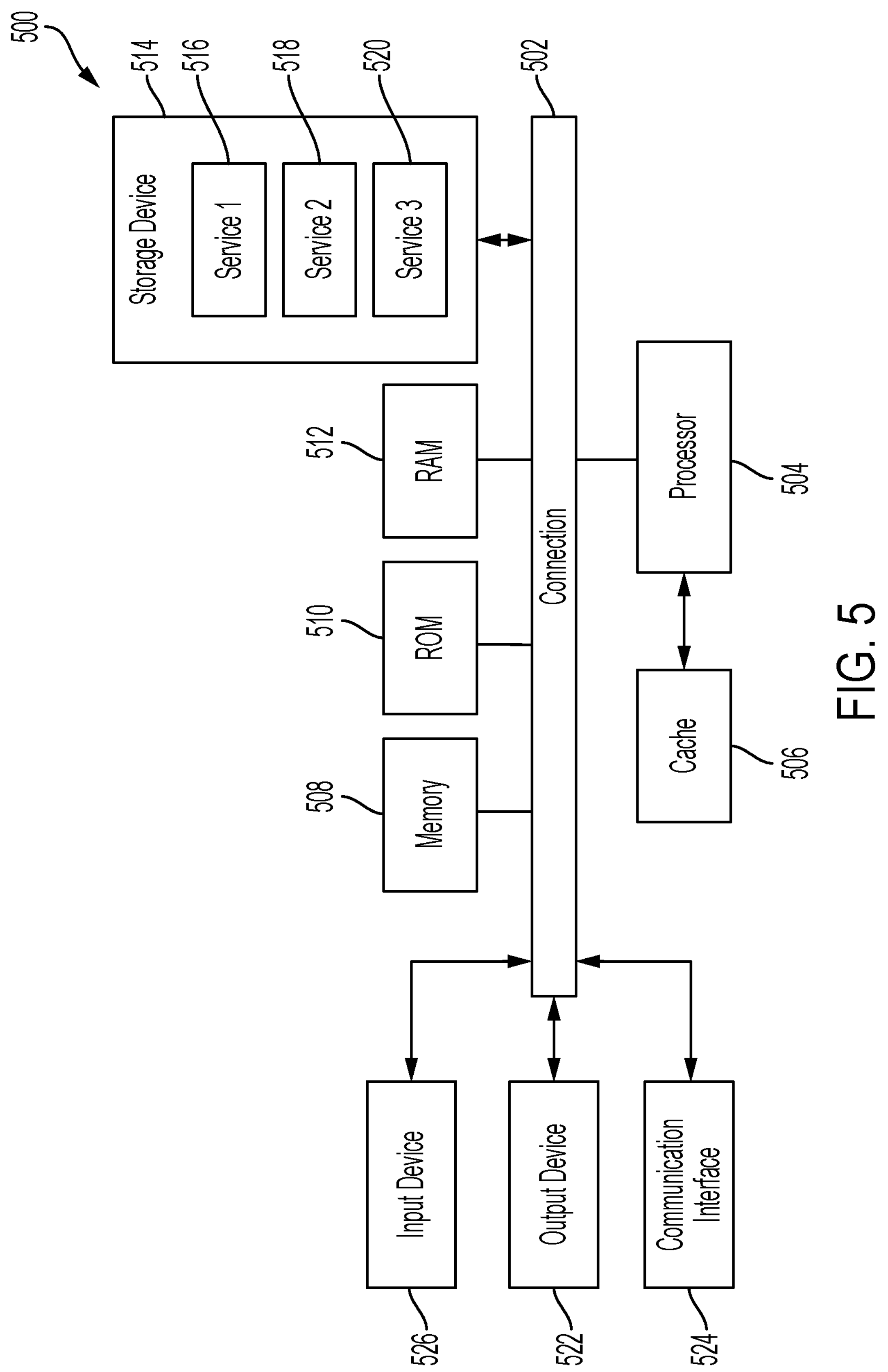
FIG. 5 shows an example of a system for implementing certain aspects of the present technology.

FIG. 5 shows an example of computing system 500, which can be for example any computing device making up the user device 102, or any component thereof in which the components of the system are in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor) 504 and connection 502 that couples various system components including system memory 508, such as read-only memory (ROM) 510 and random access memory (RAM) 512 to processor 504. Computing system 500 can include a cache of high-speed memory 506 connected directly with, in close proximity to, or integrated as part of processor 504.

Processor 504 can include any general purpose processor and a hardware service or software service, such as services 516, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the necessary hardware components, such as processor 504, connection 502, output device 522, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

One aspect of the present technology may be the gathering and use of data available from various sources that may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Further, such collection/sharing should occur after receiving the informed consent of the users.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

As used herein, the term "Focus" or "limited interruption setting" mode means any user device mode that restricts notifications to the user device of the user. Other terminology for this term can be "Do Not Disturb," or "Night Mode," or "Silent Mode."

The present technology includes computer-readable storage mediums for storing instructions, and systems for executing any one of the methods embodied in the instructions addressed in the aspects of the present technology presented below:

Aspects

Aspect 1: A method comprising: receiving, by a user device, a voicemail directed to a user associated with the user device; analyzing the voicemail, by an artificial intelligence agent, to determine an action to perform on behalf of the user based on contents of the voicemail, wherein the artificial intelligence agent also utilizes user device context information and a collection of past voicemails in the step of analyzing; outputting, by the artificial intelligence agent, a task that is relevant to the voicemail that should be performed on behalf of the user; and based on the output of the task that is relevant to the voicemail, automatically performing the task that is relevant to the voicemail on behalf of the user.

Aspect 2: The method of Aspect 1, wherein the user device context information includes one or more of a location of the user device, applications in use on the user device, an application in focus on the user device, and status of a limited interruption setting.

Aspect 3: The method of Aspects 1 or 2, further comprising: prior to or contemporaneous with the analyzing the voicemail, determining, by an urgency determination engine, to classify the voicemail as urgent; and when the voicemail is determined to be urgent, interrupting the user, by the urgency determination engine, even if the user device has a limited interruption setting enabled.

Aspect 4: The method of Aspect 3, wherein the artificial intelligence agent and the urgency determination engine are part of a same machine learning model.

Aspect 5: The method of any of Aspects 1 to 4, wherein the artificial intelligence agent also outputs a task confidence score along with the task, the task confidence score indicates a confidence by the artificial intelligence agent that the task should be performed on behalf of the user.

Aspect 6. The method of Aspect 3, further comprising: determining, with the urgency determination engine, whether the voicemail has frequency characteristics indicative of a non-human voice or periods of silence that are indicative of a non-human voice; and classifying the voicemail as not urgent if the urgency determination engine determines the voicemail has frequency characteristics indicative of a non-human voice or periods of silence that are indicative of a non-human voice.

Aspect 7. The method of Aspect 3, wherein the automatically performing the task that is relevant to the voicemail on behalf of the user is performed in response to the urgency determination engine determining that the voicemail is not urgent.

Aspect 8. A system comprising: one or more processors; and at least one computer-readable storage medium having stored therein instructions which, when executed by the one or more processors, cause the one or more processors to perform operations comprising: receiving, by a user device, a voicemail directed to a user associated with the user device; analyzing the voicemail, by an artificial intelligence agent, to determine an action to perform on behalf of the user based on contents of the voicemail, wherein the artificial intelligence agent also utilizes user device context information and a collection of past voicemails in the step of analyzing; outputting, by the artificial intelligence agent, a task that is relevant to the voicemail that should be performed on behalf of the user; and based on the output of the task that is relevant to the voicemail, automatically performing the task that is relevant to the voicemail on behalf of the user.

Aspect 9. The system of Aspect 8, wherein the user device context information includes one or more of a location of the user device, applications in use on the user device, an application in focus on the user device, and status of a limited interruption setting.

Aspect 10. The system of Aspect 8 or 9, wherein the operations further comprise: prior to or contemporaneous with the analyzing the voicemail, determining, by an urgency determination engine, to classify the voicemail as urgent; and when the voicemail is determined to be urgent, interrupting the user, by the urgency determination engine, even if the user device has a limited interruption setting enabled.

Aspect 11. The system of Aspect 10, wherein the artificial intelligence agent and the urgency determination engine are part of a same machine learning model.

Aspect 12. The system of any of Aspects 8 to 11, wherein the artificial intelligence agent also outputs a task confidence score along with the task, the task confidence score indicates a confidence by the artificial intelligence agent that the task should be performed on behalf of the user.

Aspect 13. The system of Aspect 10, wherein the operations further comprise: determining, with the urgency determination engine, whether the voicemail has frequency characteristics indicative of a non-human voice or periods of silence that are indicative of a non-human voice; and classifying the voicemail as not urgent if the urgency determination engine determines the voicemail has frequency characteristics indicative of a non-human voice or periods of silence that are indicative of a non-human voice.

Aspect 14. The system of Aspect 10, wherein the automatically performing the task that is relevant to the voicemail on behalf of the user is performed in response to the urgency determination engine determining that the voicemail is not urgent.

Aspect 15. A non-transitory computer-readable storage medium having stored therein instructions which, when executed by one or more processors, cause the one or more processors to perform operations comprising: receiving, by a user device, a voicemail directed to a user associated with the user device; analyzing the voicemail, by an artificial intelligence agent, to determine an action to perform on behalf of the user based on contents of the voicemail, wherein the artificial intelligence agent also utilizes user device context information and a collection of past voicemails in the step of analyzing; outputting, by the artificial intelligence agent, a task that is relevant to the voicemail that should be performed on behalf of the user; and based on the output of the task that is relevant to the voicemail, automatically performing the task that is relevant to the voicemail on behalf of the user.

Aspect 16. The non-transitory computer-readable storage medium of Aspect 15, wherein the user device context information includes one or more of a location of the user device, applications in use on the user device, an application in focus on the user device, and status of a limited interruption setting.

Aspect 17. The non-transitory computer-readable storage medium of Aspects 15 or 16, wherein the operations further comprise: prior to or contemporaneous with the analyzing the voicemail, determining, by an urgency determination engine, to classify the voicemail as urgent; and when the voicemail is determined to be urgent, interrupting the user, by the urgency determination engine, even if the user device has a limited interruption setting enabled.

Aspect 18. The non-transitory computer-readable storage medium of any of Aspects 15-17, wherein the artificial intelligence agent also outputs a task confidence score along with the task, the task confidence score indicates a confidence by the artificial intelligence agent that the task should be performed on behalf of the user.

Aspect 19. The non-transitory computer-readable storage medium of Aspect 17, wherein the operations further comprise: determining, with the urgency determination engine, whether the voicemail has frequency characteristics indicative of a non-human voice or periods of silence that are indicative of a non-human voice; and classifying the voicemail as not urgent if the urgency determination engine determines the voicemail has frequency characteristics indicative of a non-human voice or periods of silence that are indicative of a non-human voice.

Aspect 20. The non-transitory computer-readable storage medium of Aspect 17, wherein the automatically performing the task that is relevant to the voicemail on behalf of the user is performed in response to the urgency determination engine determining that the voicemail is not urgent.

What is claimed is:

1. A method comprising:

receiving, by a user device, a voicemail directed to a user associated with the user device;

analyzing the voicemail, by an artificial intelligence agent, to determine an action to perform on behalf of the user based on contents of the voicemail, wherein the artificial intelligence agent also utilizes user device context information and a collection of past voicemails to analyze the voicemail to determine the action to perform on behalf of the user based on the contents of the voicemail;

outputting, by the artificial intelligence agent, a task that is relevant to the voicemail and that should be performed on behalf of the user; and based on the outputting of the task that is relevant to the voicemail, automatically performing the task that is relevant to the voicemail on behalf of the user.

2. The method of claim 1, wherein the user device context information includes one or more of a location of the user device, applications in use on the user device, an application in focus on the user device, and status of a limited interruption setting.

3. The method of claim 1, further comprising:

prior to or contemporaneous with analyzing the voicemail, determining, by an urgency determination engine, to classify the voicemail as urgent; and when the voicemail is determined to be urgent, interrupting the user, by the urgency determination engine, even if the user device has a limited interruption setting enabled.

4. The method of claim 3, wherein the artificial intelligence agent and the urgency determination engine are part of a same machine learning model.

5. The method of claim 1, wherein the artificial intelligence agent also outputs a task confidence score along with the task, and wherein the task confidence score indicates a confidence by the artificial intelligence agent that the task should be performed on behalf of the user.

6. The method of claim 3, further comprising:

determining, with the urgency determination engine, whether the voicemail has frequency characteristics indicative of a non-human voice or periods of silence that are indicative of a non-human voice; and classifying the voicemail as not urgent if the urgency determination engine determines the voicemail has the frequency characteristics indicative of a non-human voice or the periods of silence that are indicative of a non-human voice.

7. The method of claim 3, wherein automatically performing the task that is relevant to the voicemail on behalf of the user is performed in response to the urgency determination engine determining that the voicemail is not urgent.

8. A system comprising:

one or more processors; and at least one computer-readable storage medium having stored therein instructions which, when executed by the one or more processors, cause the one or more processors to perform operations comprising:

receiving, by a user device, a voicemail directed to a user associated with the user device;

analyzing the voicemail, by an artificial intelligence agent, to determine an action to perform on behalf of the user based on contents of the voicemail, wherein the artificial intelligence agent also utilizes user device context information and a collection of past voicemails to analyze the voicemail to determine the action to perform on behalf of the user based on the contents of the voicemail;

outputting, by the artificial intelligence agent, a task that is relevant to the voicemail and that should be performed on behalf of the user; and based on the outputting of the task that is relevant to the voicemail, automatically performing the task that is relevant to the voicemail on behalf of the user.

9. The system of claim 8, wherein the user device context information includes one or more of a location of the user device, applications in use on the user device, an application in focus on the user device, and status of a limited interruption setting.

10. The system of claim 8, wherein the operations further comprise:

prior to or contemporaneous with analyzing the voicemail, determining, by an urgency determination engine, to classify the voicemail as urgent; and when the voicemail is determined to be urgent, interrupting the user, by the urgency determination engine, even if the user device has a limited interruption setting enabled.

11. The system of claim 10, wherein the artificial intelligence agent and the urgency determination engine are part of a same machine learning model.

12. The system of claim 8, wherein the artificial intelligence agent also outputs a task confidence score along with the task, and wherein the task confidence score indicates a confidence by the artificial intelligence agent that the task should be performed on behalf of the user.

13. The system of claim 10, wherein the operations further comprise:

determining, with the urgency determination engine, whether the voicemail has frequency characteristics indicative of a non-human voice or periods of silence that are indicative of a non-human voice; and classifying the voicemail as not urgent if the urgency determination engine determines the voicemail has the frequency characteristics indicative of a non-human voice or the periods of silence that are indicative of a non-human voice.

14. The system of claim 10, wherein automatically performing the task that is relevant to the voicemail on behalf of the user is performed in response to the urgency determination engine determining that the voicemail is not urgent.

15. A non-transitory computer-readable storage medium having stored therein instructions which, when executed by one or more processors, cause the one or more processors to perform operations comprising:

receiving, by a user device, a voicemail directed to a user associated with the user device;

analyzing the voicemail, by an artificial intelligence agent, to determine an action to perform on behalf of the user based on contents of the voicemail, wherein the artificial intelligence agent also utilizes user device context information and a collection of past voicemails to analyze the voicemail to determine the action to perform on behalf of the user based on the contents of the voicemail;

outputting, by the artificial intelligence agent, a task that is relevant to the voicemail and that should be performed on behalf of the user; and based on the outputting of the task that is relevant to the voicemail, automatically performing the task that is relevant to the voicemail on behalf of the user.

16. The non-transitory computer-readable storage medium of claim 15, wherein the user device context information includes one or more of a location of the user device, applications in use on the user device, an application in focus on the user device, and status of a limited interruption setting.

17. The non-transitory computer-readable storage medium of claim 15, wherein the operations further comprise:

prior to or contemporaneous with analyzing the voicemail, determining, by an urgency determination engine, to classify the voicemail as urgent; and when the voicemail is determined to be urgent, interrupting the user, by the urgency determination engine, even if the user device has a limited interruption setting enabled.

18. The non-transitory computer-readable storage medium of claim 15, wherein the artificial intelligence agent also outputs a task confidence score along with the task, and wherein the task confidence score indicates a confidence by the artificial intelligence agent that the task should be performed on behalf of the user.

19. The non-transitory computer-readable storage medium of claim 17, wherein the operations further comprise:

determining, with the urgency determination engine, whether the voicemail has frequency characteristics indicative of a non-human voice or periods of silence that are indicative of a non-human voice; and classifying the voicemail as not urgent if the urgency determination engine determines the voicemail has the frequency characteristics indicative of a non-human voice or the periods of silence that are indicative of a non-human voice.

20. The non-transitory computer-readable storage medium of claim 17, wherein automatically performing the task that is relevant to the voicemail on behalf of the user is performed in response to the urgency determination engine determining that the voicemail is not urgent.

21. The non-transitory computer-readable storage medium of claim 17, wherein the artificial intelligence agent and the urgency determination engine are part of a same machine learning model.

* * * * *